(12) United States Patent
Kawasetsu et al.

(10) Patent No.: US 8,870,231 B2
(45) Date of Patent: Oct. 28, 2014

(54) FIBER-REINFORCED RESIN PIPE

(75) Inventors: Nozomu Kawasetsu, Nagasaki (JP); Yoshinori Nonaka, Nagasaki (JP); Kenji Tanaka, Nagasaki (JP); Koji Ando, Nagasaki (JP); Hiroshi Tanaka, Joetsu (JP); Yuuichi Kawai, Joetsu (JP)

(73) Assignees: Mitsubishi Heavy Industries, Ltd., Tokyo (JP); Arisawa Mfg. Co., Ltd., Niigata (JP)

( * ) Notice: Subject to any disclaimer, the term of this patent is extended or adjusted under 35 U.S.C. 154(b) by 939 days.

(21) Appl. No.: 12/738,900

(22) PCT Filed: Apr. 24, 2009

(86) PCT No.: PCT/JP2009/058205
§ 371 (c)(1),
(2), (4) Date: Apr. 20, 2010

(87) PCT Pub. No.: WO2009/133825
PCT Pub. Date: Nov. 5, 2009

(65) Prior Publication Data
US 2010/0206421 A1    Aug. 19, 2010

(30) Foreign Application Priority Data
Apr. 30, 2008  (JP) ................. 2008-119302

(51) Int. Cl.
| F16L 9/14 | (2006.01) |
| F16L 41/08 | (2006.01) |
| B01D 61/10 | (2006.01) |
| C02F 1/44 | (2006.01) |
| F16L 41/03 | (2006.01) |
| B01D 61/02 | (2006.01) |
| C02F 103/08 | (2006.01) |

(52) U.S. Cl.
CPC ............... *F16L 9/14* (2013.01); *B01D 2313/10* (2013.01); *B01D 61/025* (2013.01); *F16L 41/08* (2013.01); *B01D 61/10* (2013.01); *B01D 2313/06* (2013.01); *C02F 2103/08* (2013.01); *C02F 1/441* (2013.01); *F16L 41/03* (2013.01); *Y10S 285/919* (2013.01)
USPC ........................................ 285/204; 285/919

(58) Field of Classification Search
USPC ......... 285/201–204, 211, 222, 192, 208, 345, 285/351, 919; 210/652–655; 277/626
See application file for complete search history.

(56) References Cited

U.S. PATENT DOCUMENTS 935,984 A * 10/1909 Hinck ................... 285/208 X
3,457,170 A * 7/1969 Havens ................. 210/655 X
(Continued)

FOREIGN PATENT DOCUMENTS

JP   05-164284 A    6/1993
JP   2000-346269 A  12/2000
(Continued)

OTHER PUBLICATIONS

Japanese Office Action issued in Japanese Application No. 2008-119302 dated Jul. 14, 2011.
(Continued)

*Primary Examiner* — Gregory Binda
(74) *Attorney, Agent, or Firm* — Sughrue Mion, PLLC

(57) ABSTRACT

In a fiber-reinforced resin pipe for introducing and discharging a liquid, a pipe (1) is provided with a plurality of introduction/discharge parts (2) for introducing or discharging liquid that are arranged at intervals in the axial direction from a peripheral surface of the pipe.

8 Claims, 9 Drawing Sheets

(56) References Cited

U.S. PATENT DOCUMENTS 5,944,365 A * 8/1999 Kizler et al.
2008/0030021 A1 * 2/2008 Theilen

FOREIGN PATENT DOCUMENTS

| JP | 2003-301492 A | 10/2003 |
| JP | 2004-003583 A | 1/2004 |
| JP | 2004-205131 A | 7/2004 |
| JP | 3621058 B2 | 11/2004 |
| JP | 2005-279695 A | 10/2005 |
| JP | 2006-015573 A | 1/2006 |
| JP | 2006-281619 A | 10/2006 |
| JP | 2006-283879 A | 10/2006 |

OTHER PUBLICATIONS

International Preliminary Report on Patentability issued in PCT/JP2009/058205 dated Dec. 23, 2010 (6 pages).

International Search Report for International Application No. PCT/JP2009/058205, dated Jul. 28, 2009, 5 pages.

* cited by examiner

FIG. 12

| | Shell Portion | A: Joint structure of joint part | | | | B: Closure structure of closure lid | | | | | | C: Structure of introduction/discharge part | | | | Burst Pressure [MPa] (psi) |
|---|---|---|---|---|---|---|---|---|---|---|---|---|---|---|---|---|
| | FW wall thickness [mm] | FW wall thickness [mm] | O-ring groove position | Flange thickness [mm] | FW wall thickness [mm] | Helical winding | Hoop (90°) layer [mm] | Retainer groove-end length [mm] | FRP end plate thickness [mm] | FRP retainer ring thickness [mm] | Hoop (90°) layer [mm] | Port hole shape | Sealing method | FW minimum wall thickness after hole formation | FRP semicircle spacer [mm] | Specification 22.06 (3200) |
| Exp. 1 | 43 | 57 | FW side | 43 | 43 | None | None | 110 | 45 | 14 | None | 2-level stepped R1 | Lateral surface O-ring | 22 | None | 33.6 (4873) |
| Exp. 2 | 30 | 57 | Flange side | 35 | 30 | None | None | 85 | 45 | 14 | None | 2-level stepped R1 | Bottom surface flat packing seal | 22 | None | 26.8 (3887) |
| Exp. 3 | 30 | 57 | Flange side | 35 | 30 | None | None | 85 | 45 | 14 | Present 6 | 2-level stepped R3 | Bottom surface flat packing seal | 30 | None | 33.2 (4185) |
| Exp. 4 | 20 | 57 | Flange side | 35 | 31 | Present | Present 6 | 85 | 45 | 14 | Present 6 | Straight | Lateral surface O-ring + flat packing seal | 21 | Present 21 | 30.5 (4423) |
| Exp. 5 | 25 | 57 | Flange side | 35 | 27 | None | Present 2 | 85 | 45 | 14 | None | Straight | Lateral surface O-ring + flat packing seal | 20 | Present 21 | 36.5 (5293) |

FIBER-REINFORCED RESIN PIPE

CROSS REFERENCE TO RELATED APPLICATION

This application is a National Stage of International Application No. PCT/JP2009/058205 filed Apr. 24, 2009, which claims priority from Japanese Patent Application No. 2008-119302, filed Apr. 30, 2008.

TECHNICAL FIELD

The present invention relates to a fiber-reinforced resin pipe.

BACKGROUND ART

A method whereby seawater/salt water or the like is introduced into and subsequently compressed in a pressure vessel such as the one disclosed in Patent Document 1, for example, loaded with a hollow fiber membrane or spiral membrane, and separated into fresh water and concentrated seawater is commonly used in reverse osmosis seawater desalination plant equipment.

Since seawater is introduced into the pressure vessel and concentrated seawater is conducted out of the pressure vessel, extremely high corrosion resistance (rust resistance) is needed in the pressure vessel in contact with the seawater and concentrated seawater, the closure lid for closing the end parts of the pressure vessel, and the ducts connected to the pressure vessel.

In a reverse osmosis method for converting seawater into fresh water, the inside of the pressure vessel is continuously subjected to a pressure of 800 to 120 psi (5.5 to 8.3 MPa), which is 5.5 to 8.3 times the 1 MPa pressure of compressed air generated by a common compressor.

The pressure vessel for converting seawater into fresh water must also pass the Section X qualification test specified by the ASME (American Society of Mechanical Engineers). Specifically, according to the Section X qualification test, the pressure applied to cause the pressure vessel to break after pressurization to the operating pressure of 800 to 1200 psi (5.5 to 8.3 MPa) and depressurization are repeated 10,000 times must be six or more times the pressure of 800 to 1200 psi (5.5 to 8.3 MPa). Specifically, the pressure vessel for converting seawater into fresh water must have a pressure resistance of 4800 psi (33 MPa) or higher.

The ducts connected to the pressure vessel are therefore constructed using stainless steel, particularly pipes made of super stainless steel such as 254SMO, YUS270, SAF2507, or Super Duplex, having excellent corrosion resistance.

Specifically, reverse osmosis requires an RO module composed of a vessel (pressure vessel) and an RO element, and a duct for connecting these components. The RO module used to convert seawater into fresh water is usually subjected to a pressure equivalent to 6.895 MPa (1000 psi) or higher, and since the ducts used in the RO module are also subjected to a pressure equivalent to 6.895 MPa (1000 psi) or higher, the design must take pressure resistance into consideration.

For example, a seawater desalination device such as shown in FIG. 1 is formed in which a plurality of RO modules 42 is installed in a frame 41, and the ends of the RO modules 42 are provided with manifolds 43 composed of seawater introduction tubes 44 for introducing seawater, concentrated seawater outlet tubes 45 for discharging the concentrated seawater after the seawater has been separated into concentrated seawater and fresh water, and other components. The seawater introduction tubes 44, concentrated seawater outlet tubes 45, and other components are also constructed using pipes made of stainless steel such as 254SMO, YUS270, SAF2507, and Super Duplex, for example, as with the pressure vessel. The reference numeral 46 in FIG. 1 refers to fresh water outlet tubes for discharging fresh water.

PRIOR ART REFERENCES

Patent References

[Patent Reference 1] Japanese Patent No. 3621058

DISCLOSURE OF THE INVENTION

Problems the Invention is Intended to Solve

The seawater introduction tubes 44 and concentrated seawater outlet tubes 45 are sealed at one end and configured so that numerous introduction/outlet parts 47 (side ports) for allowing the ingress and egress of liquid are provided to the peripheral surfaces of the pipes. The seawater introduction tubes 44 and concentrated seawater outlet tubes 45 are connected via the side ports at each level to the ends of the RO modules arranged in the frame 41, and introduce seawater and discharge concentrated seawater.

However, the inventors have discovered that a duct constructed using super stainless steel pipe has drawbacks such as those described below.

Specifically, in order to provide a side port to a super stainless steel pipe, a side hole must be formed and a super stainless steel short pipe element welded in the side hole. Not only is corrosion prone to start at the welded portion, but an advanced welding technique is required (the pipe will break if a normal stainless steel weld is used; therefore, advanced techniques are needed for the welding method, selection of the weld site, and other aspects), and cost is thus increased. Repair is also extremely inconvenient when defects are found. Furthermore, the current elevated prices of nickel, molybdenum, and chromium further increase costs, and increased delivery times have the effect of lengthening the time taken to construct the seawater desalination plant equipment.

When one end of the pipe is closed, the super stainless steel closure lid must be welded to the end, or a sealing lid (so-called blind cap) is needed, and the same problems as those described above occur when the lid is connected by welding.

An object of the present invention for overcoming the problems described above is to provide an extremely practical fiber-reinforced resin pipe that is lightweight and easy to handle, that does not require a weld joint to provide an introduction/outlet part, closure lid, or other component, that has excellent corrosion resistance, and that is substantially less expensive than super stainless steel pipes.

Means Used to Solve the Above-Mentioned Problems

The main points of the present invention are described below with reference to the attached drawings.

A first aspect of the present invention is a fiber-reinforced resin pipe for introducing and discharging a liquid, the fiber-reinforced resin pipe characterized in that the pipe 1 is provided with a plurality of introduction/discharge parts 2 for introducing or discharging a liquid via a peripheral surface of the pipe 1, the introduction/discharge parts 2 being arranged at intervals in the axial direction; the introduction/discharge parts 2 comprise a through-hole 4 formed in the peripheral surface of the pipe 1, and a cylinder 6 having a collar 5 at one end thereof, the cylinder 6 being provided in the through-hole 4; and a spacer 7 is provided between the collar 5 of the cylinder 6 and an internal peripheral surface 1a of the pipe 1, the spacer 7 having an upper surface shape that conforms to the curved shape of the internal peripheral surface 1a.

A second aspect of the present invention is the fiber-reinforced resin pipe according to the first aspect, wherein the fiber-reinforced resin pipe is characterized in that a first seal member 8 for forming a seal between an external peripheral surface 6a of the cylinder 6 and an internal peripheral surface 4a of the through-hole 4 is provided to the external peripheral surface 6a of the cylinder 6.

A third aspect of the present invention is the fiber-reinforced resin pipe according to the second aspect, wherein the fiber-reinforced resin pipe is characterized in that a second seal member 9 for forming a seal between an upper surface 5a of the collar 5 and a bottom surface 7a of the spacer 7 is provided between the upper surface 5a of the collar 5 and the bottom surface 7a of the spacer 7.

A fourth aspect of the present invention is the fiber-reinforced resin pipe according to the third aspect, wherein the fiber-reinforced resin pipe is characterized in that a third seal member 10 for forming a seal between an upper surface 7b of the spacer 7 and an internal peripheral surface 1a of the pipe 1 is provided between the upper surface 7b of the spacer 7 and the internal peripheral surface 1a of the pipe 1.

A fifth aspect of the present invention is a fiber-reinforced resin pipe for introducing and discharging a liquid; wherein the fiber-reinforced resin pipe is characterized in that the pipe 1 is provided with a plurality of introduction/discharge parts 2 for introducing or discharging a liquid via a peripheral surface of the pipe 1, the introduction/discharge parts 2 being arranged at intervals in the axial direction; and the introduction/discharge parts 2 comprise a through-hole 4 having a concave step part 3 in a portion communicating with the inside of the pipe, the through-hole 4 being formed in the peripheral surface of the pipe 1; and a cylinder 6 having at one end a collar 5 for engaging with the concave step part 3, the cylinder 6 being provided in the through-hole 4.

A sixth aspect of the present invention is the fiber-reinforced resin pipe according to the fifth aspect, wherein the fiber-reinforced resin pipe is characterized in that a fourth seal member 11 for forming a seal between an external peripheral surface 6a of the cylinder 6 and an internal peripheral surface 4a of the through-hole 4 is provided to the external peripheral surface 6a of the cylinder 6.

A seventh aspect of the present invention is the fiber-reinforced resin pipe according to the sixth aspect, wherein the fiber-reinforced resin pipe is characterized in that a fifth seal member 12 for forming a seal between an upper surface 5a of the collar 5 and a bottom surface 3a of the concave step part 3 is provided between the upper surface 5a of the collar 5 and the bottom surface 3a of the concave step part 3 opposite the upper surface 5a of the collar 5.

An eighth aspect of the present invention is the fiber-reinforced resin pipe according to the fourth aspect, wherein the fiber-reinforced resin pipe is characterized in that one end of the pipe 1 is closed by a closure lid 13.

A ninth aspect of the present invention is the fiber-reinforced resin pipe according to the seventh aspect, wherein the fiber-reinforced resin pipe is characterized in that one end of the pipe 1 is closed by a closure lid 13.

A tenth aspect of the present invention is the fiber-reinforced resin pipe according to the eighth aspect, wherein the fiber-reinforced resin pipe is characterized in that a joint part 14 that is joined to another member is provided to an end of the pipe 1.

An eleventh aspect of the present invention is the fiber-reinforced resin pipe according to the ninth aspect, wherein the fiber-reinforced resin pipe is characterized in that a joint part 14 that is joined to another member is provided to an end of the pipe 1.

A twelfth aspect of the present invention is the fiber-reinforced resin pipe according to the tenth aspect, wherein the fiber-reinforced resin pipe is characterized in that a sixth seal member 15 for forming a seal between an end surface 1b of the pipe 1 and an opposing surface 14a of the joint part 14 is provided to the opposing surface 14a of the joint part 14 opposite the end surface 1b of the pipe 1.

A thirteenth aspect of the present invention is the fiber-reinforced resin pipe according to the eleventh aspect, wherein the fiber-reinforced resin pipe is characterized in that a sixth seal member 15 for forming a seal between an end surface 1b of the pipe 1 and an opposing surface 14a of the joint part 14 is provided to the opposing surface 14a of the joint part 14 opposite the end surface 1b of the pipe 1.

A fourteenth aspect of the present invention is the fiber-reinforced resin pipe according to the twelfth aspect, wherein the fiber-reinforced resin pipe is characterized in that each of the introduction/discharge parts 2 is provided in the same position in the peripheral direction.

A fifteenth aspect of the present invention is the fiber-reinforced resin pipe according to the thirteenth aspect, wherein the fiber-reinforced resin pipe is characterized in that each of the introduction/discharge parts 2 is provided in the same position in the peripheral direction.

A sixteenth aspect of the present invention is the fiber-reinforced resin pipe according to the twelfth aspect, wherein the fiber-reinforced resin pipe is characterized in that each of the introduction/discharge parts 2 adjacent to each other is provided in mutually different positions in the peripheral direction.

A seventeenth aspect of the present invention is the fiber-reinforced resin pipe according to the thirteenth aspect, wherein the fiber-reinforced resin pipe is characterized in that each of the introduction/discharge parts 2 adjacent to each other is provided in mutually different positions in the peripheral direction.

An eighteenth aspect of the present invention is the fiber-reinforced resin pipe according to the sixteenth aspect, wherein the fiber-reinforced resin pipe is characterized in that each of the introduction/discharge parts 2 adjacent to each other is provided in positions 90° or 180° apart from each other in the peripheral direction.

A nineteenth aspect of the present invention is the fiber-reinforced resin pipe according to the seventeenth aspect, wherein the fiber-reinforced resin pipe is characterized in that each of the introduction/discharge parts 2 adjacent to each other is provided in positions 90° or 180° apart from each other in the peripheral direction.

A twentieth aspect of the present invention is the fiber-reinforced resin pipe according to the fourteenth aspect, wherein the fiber-reinforced resin pipe is characterized in that the pipe 1 is used in a desalination treatment involving reverse osmosis.

A twenty-first aspect of the present invention is the fiber-reinforced resin pipe according to the fifteenth aspect, wherein the fiber-reinforced resin pipe is characterized in that the pipe 1 is used in a desalination treatment involving reverse osmosis.

A twenty-second aspect of the present invention is the fiber-reinforced resin pipe according to the sixteenth aspect, wherein the fiber-reinforced resin pipe is characterized in that the pipe 1 is used in a desalination treatment involving reverse osmosis.

A twenty-third aspect of the present invention is the fiber-reinforced resin pipe according to the seventeenth aspect, wherein the fiber-reinforced resin pipe is characterized in that the pipe 1 is used in a desalination treatment involving reverse osmosis.

A twenty-fourth aspect of the present invention is the fiber-reinforced resin pipe according to the eighteenth aspect, wherein the fiber-reinforced resin pipe is characterized in that the pipe 1 is used in a desalination treatment involving reverse osmosis.

A twenty-fifth aspect of the present invention is the fiber-reinforced resin pipe according to the nineteenth aspect, wherein the fiber-reinforced resin pipe is characterized in that the pipe 1 is used in a desalination treatment involving reverse osmosis.

Effect of the Invention

The present invention is configured as described above, and is therefore an extremely practical fiber-reinforced resin pipe that is lightweight and easy to handle, that does not require a weld joint to provide an introduction/outlet part, closure lid, or other component, and that has excellent corrosion resistance as well as extremely low cost relative to a super stainless steel pipe.

BRIEF DESCRIPTION OF THE DRAWINGS

FIG. 12 is a table showing the experimental conditions and results.

BEST MODE FOR CARRYING OUT THE INVENTION

Figure 1:
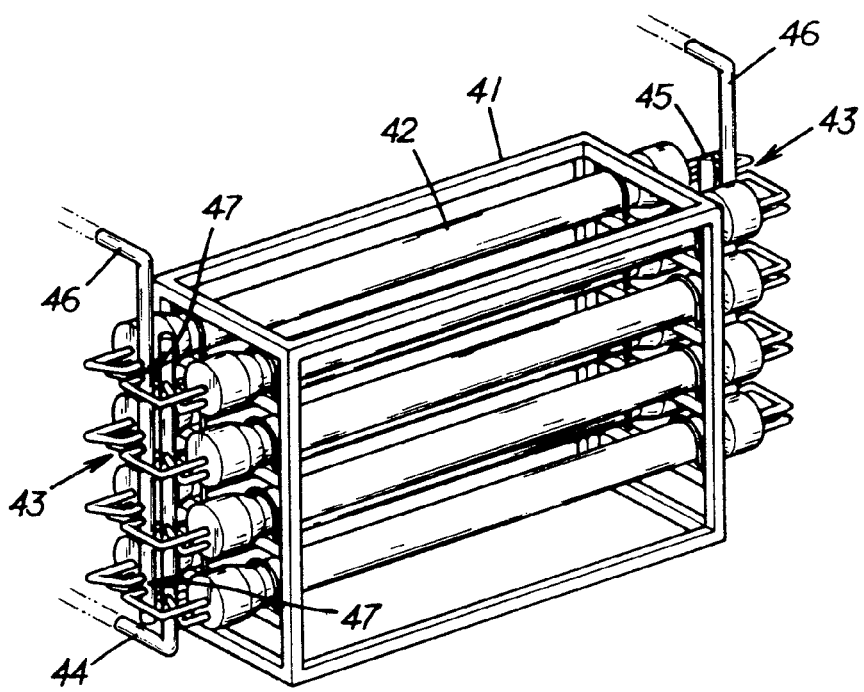
FIG. 1 is a schematic perspective view showing an example of a seawater desalination device.

Preferred embodiments of the present invention are briefly described below with reference to the drawings while indicating the operation of the present invention.

Since the pipe 1 is made of fiber-reinforced resin, a pipe 1 provided with a plurality of introduction/discharge parts 2 (side ports) can be manufactured so as to have highly exceptional corrosion resistance and lightness of weight, and that is substantially less expensive than a super stainless steel pipe.

Specifically, the introduction/discharge parts 2 can be satisfactorily provided to the pipe 1 without a weld joint by adopting configurations in which the introduction/discharge parts 2 are composed of a through-hole 4 formed in the peripheral surface of the pipe 1, and a cylinder 6 having a collar 5 at one end thereof, the cylinder 6 being provided in the through-hole 4; a spacer 7 having an upper surface shape that conforms to the curved shape of the internal peripheral surface 1a is provided between the collar 5 of the cylinder 6 and the internal peripheral surface 1a of the pipe; and the introduction/discharge parts 2 are composed of a through-hole 4 having a concave step part 3 in a portion communicating with the inside of the pipe, the through-hole 4 being formed in the peripheral surface of the pipe 1, and a cylinder 6 having a collar 5 for engaging with the concave step part 3 at one end thereof, the cylinder 6 being provided in the through-hole 4, for example.

Moreover, when a closure lid 13 is provided to one end of the pipe 1, a concave part 17 can be provided to the internal surface of the pipe 1 (since the pipe 1 is made of fiber-reinforced resin, a concave part is easier to mold than in a case in which the pipe is made of super stainless steel), the closure lid 13 can be bolted to a retainer ring 16 fitted in the concave part 17, and one end of the pipe can be satisfactorily closed without the need for a weld joint, for example.

Through the use of a closure structure and attachment structure for the introduction/discharge parts 2 such as described above, the burst pressure can be set to 4 MPa or higher, a design pressure of 5.516 MPa (800 psi) or higher required for ducts used in an RO module, for example, can be achieved, and high corrosion resistance can be achieved together with the ability to suitably utilize the present invention not only in a reverse osmosis desalination device, but also in other applications; e.g., as a duct in a soy sauce manufacturing device or the like.

Furthermore, when a joint part 14 is provided to an end of the pipe 1, the joint part 14 can be provided by a bolt connection or the like to the end of the pipe 1, for example, and the joint part 14 can be satisfactorily provided without the need for a weld joint.

Consequently, there is no need for advanced welding techniques, costs are thereby reduced accordingly, and welded portions that are prone to corrosion can also be eliminated. Corrosion resistance is therefore correspondingly improved, thus making the present invention extremely well suited for use as a duct in a seawater desalination device, soy sauce manufacturing device, or the like.

EXAMPLES

Specific examples of the present invention are described below with reference to FIGS. 2 through 12.

Figure 2:
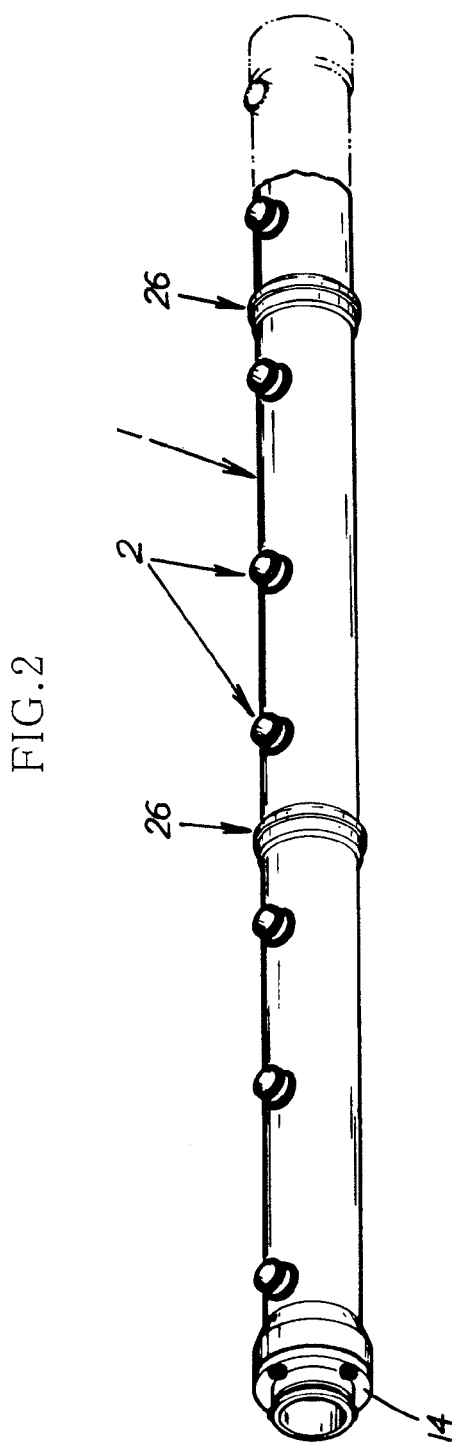
FIG. 2 is a schematic perspective view showing the main example.

The main example is of a fiber-reinforced resin pipe for introducing and discharging a liquid, as shown in FIG. 2, and a plurality of introduction/discharge parts 2 for introducing or discharging liquid is arranged in the axial direction from the peripheral surface of the pipe 1.

The pipe of the main example is formed by (helically) winding the necessary quantity of glass fibers impregnated with a resin that includes epoxy resin and a curing agent thereof continuously and at a sharp angle with respect to the axial core direction of a mandrel using a publicly known filament winding method, heat-curing the epoxy resin, and then removing the mandrel; and the pipe is used as a duct in a reverse osmosis desalination device. The resin is not limited to epoxy resin; polyester resin, vinyl ester resin, or other resin may be used. The fibers are also not limited to glass fibers; carbon fibers or other fibers may also be used. The winding method is also not limited to a filament winding method; the pipe may be formed using a hand lay-up method, sheet winding method, or other method.

Each component will be specifically described.

Figure 3:
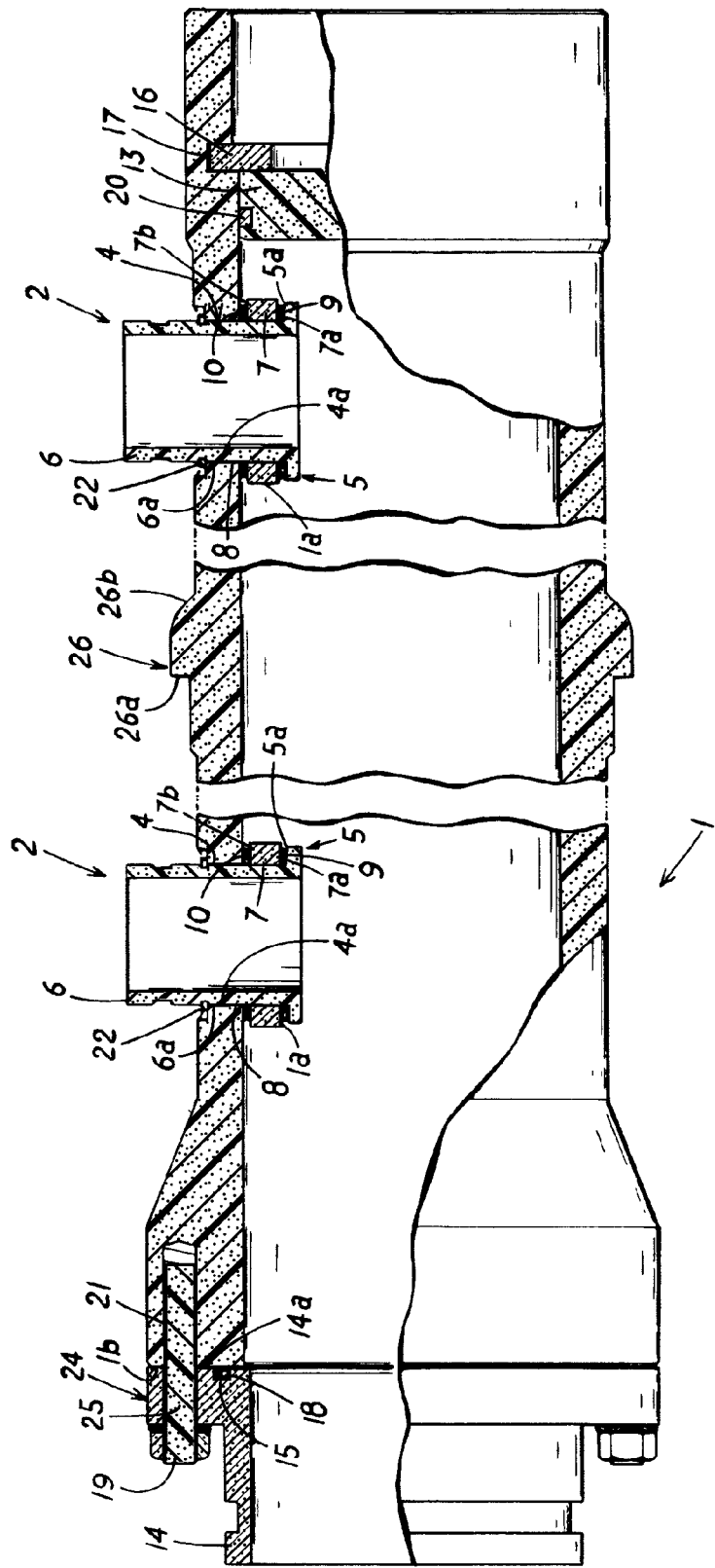
FIG. 3 is an enlarged schematic longitudinal sectional view showing the main example.

One end of the pipe 1 is closed by using a bolt to attach a fiber-reinforced resin (FRP) closure lid 13 having substantially the same diameter as the internal peripheral surface 1*a* of the pipe 1 to an FRP retainer ring 16 that is placed in a concave part 17 provided to the internal peripheral surface 1*a* of the pipe 1, as shown in FIG. 3. In FIG. 3, the reference numeral 20 refers to an O-ring for forming a seal between the closure lid 13 and the internal peripheral surface 1*a* of the pipe 1.

The concave part 17 may be provided by simply cutting a concave groove into the internal peripheral surface 1*a* of the closure lid 13. A ring or the like may also be fitted on the mandrel in advance when the fibers are wound thereon, and the concave part 17 formed in the internal peripheral surface 1*a* by the ring.

A joint part 14 having a Victaulic joint structure joined to another member and made of a material suited to the internal liquid is attached by a bolt 19 inserted in a through-hole 25 formed in a flange 24 of the joint part 14. Since a screw hole into which the bolt 19 is screwed is formed in this other end, the outside diameter is somewhat larger, and the strength thereof must be maintained.

Specifically, a concave groove 18 is provided in the opposing surface 14*a* of the joint part 14 opposite the end surface 1*b* of the pipe 1, and a sixth seal member 15 (O-ring) for forming a seal between the end surface 1*b* of the pipe 1 and the opposing surface 14*a* of the joint part 14 is loaded into the concave groove 18. A concave groove may also be formed on the side of the end surface 1*b* of the pipe 1 and the O-ring loaded into the concave groove, but the fibers of the pipe 1 would then be cut, and the wall thickness of the end part of the pipe 1 would then have to be correspondingly increased. Specifically, when an O-ring groove is provided in the end surface of the pipe 1, since the site of the cut becomes a starting point for breakage, it is preferred that the O-ring groove be provided on the side of the joint member (joint part 14).

The introduction/discharge parts 2 are each provided in the same position in the peripheral direction. In the main example, twelve introduction/discharge parts 2 are provided to a pipe 1 having an inside diameter of approximately 8 inches and a length of approximately 7200 mm (including the joint part 14). In the case of a super stainless steel pipe, segments about 2400 mm in length, for example, would have to be welded together in order to obtain the same pipe having a length of approximately 7200 mm, but the main example in which the pipe is produced by a filament winding method does not necessitate joining of segments, and a pipe of the desired length can be obtained. The main example is extremely cost effective in this respect as well.

The configuration described above is not limiting, and the introduction/discharge parts 2 adjacent to each other may each be provided in mutually different positions in the peripheral direction. For example, a series arrangement in the 12 o'clock and 3 o'clock positions (positions varying by 90° at a time), or a series arrangement in the 12 o'clock and 6 o'clock positions (positions varying by 180° at a time) may be adopted.

Figure 4:
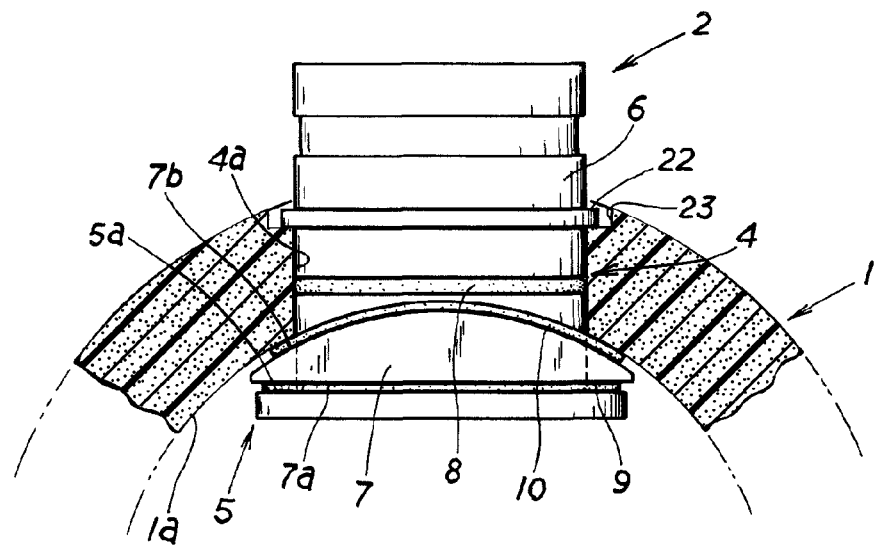
FIG. 4 is an enlarged schematic transverse sectional view showing the main example.

As shown in FIGS. 3 and 4, the introduction/discharge parts 2 are each composed of a through-hole 4 formed in the peripheral surface of the pipe 1, and a cylinder 6 having a collar 5 at one end thereof, the cylinder 6 being provided in the through-hole 4, and an FRP spacer 7 having an upper surface shape that conforms to the curved shape of the internal peripheral surface 1*a* is provided between the collar 5 of the cylinder 6 and the internal peripheral surface 1*a* of the pipe. In the drawings, the reference numeral 23 refers to a step part with which a snap ring 22 for engaging with the cylinder 6 is engaged.

Figure 5:
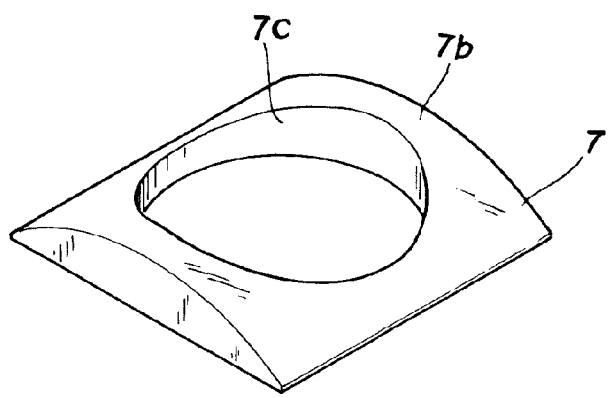
FIG. 5 is a schematic perspective view showing the spacer of the main example.

Specifically, as shown in FIG. 5, the upper surface 7*b* of the spacer 7 has a semicircular shape that is convexly curved so as to conform to the concave curved shape of the internal peripheral surface 1*a* of the pipe 1, and a through-hole 7*c* is provided in the center thereof, through which the trunk of the cylinder 6 is inserted.

Consequently, the cylinder 6 can be held in place by the collar 5 without the need to form a concave step part in the internal peripheral surface 1*a* of the pipe 1 (as in Alternate Examples 2-1 and 2-2 described hereinafter), and the wall thickness of the pipe 1 can be correspondingly reduced.

A first seal member 8 (O-ring) for forming a seal between the external peripheral surface 6*a* of the cylinder 6 and the internal peripheral surface 4*a* of the through-hole 4 is loaded onto the external peripheral surface 6*a* of the cylinder 6. A seal can therefore be formed between the cylinder 6 and the through-hole 4 by the first seal member 8.

A second seal member 9 (flat packing seal) for forming a seal between the upper surface 5*a* of the collar 5 and the bottom surface 7*a* of the spacer 7 is provided between the upper surface 5*a* of the collar 5 and the bottom surface 7*a* of the spacer 7. Furthermore, a third seal member 10 (flat packing seal) for forming a seal between the upper surface 7*b* of the spacer 7 and the internal peripheral surface 1*a* of the pipe 1 is provided between the upper surface 7*b* of the spacer 7 and the internal peripheral surface 1*a* of the pipe 1.

Consequently, even if the through-hole 4 were to be widened by the effects of internal pressure (when the pipe is subjected to internal pressure, the entire pipe expands; as viewed in cross-section, pipe deformation occurs whereby the circular external periphery increases in size) so that the first seal member 8 were no longer effective, the second seal member 9 and the third seal member 10 are pressed outward by the internal pressure, whereby the sealing functions thereof are reliably demonstrated, and the side ports are correspondingly well-sealed.

Figure 6:
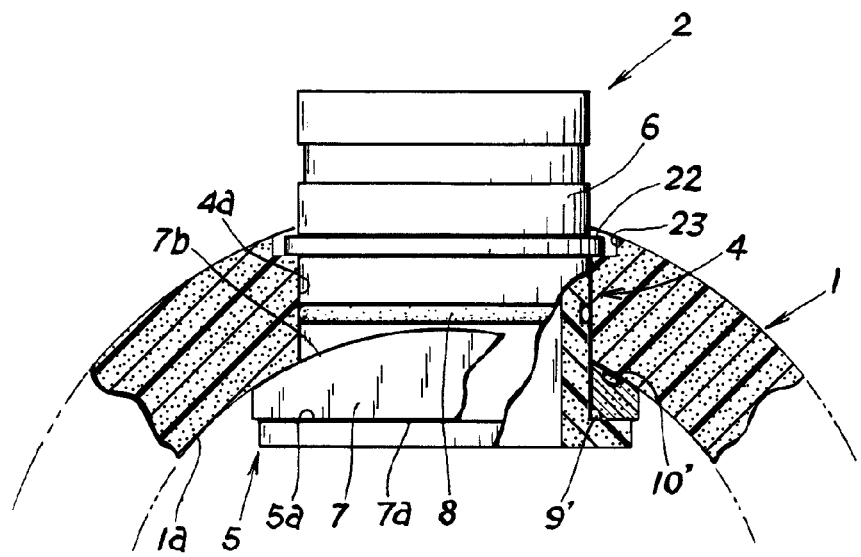
FIG. 6 is an enlarged schematic transverse sectional view showing Alternate Example 1.
Figure 7:
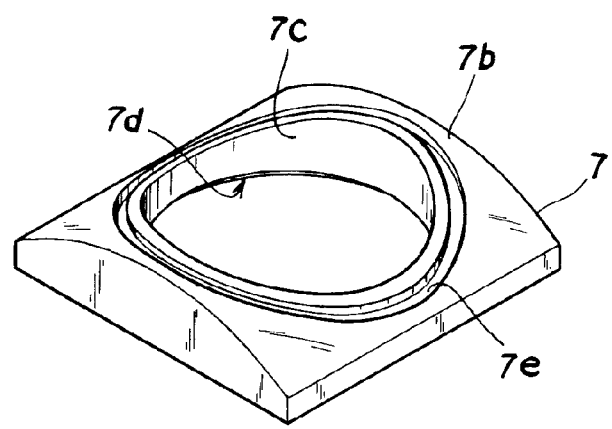
FIG. 7 is a schematic perspective view showing the spacer of Alternate Example 1.

A second seal member 9' and third seal member 10' composed of O-rings rather than flat packing seals may also be used, as in Alternate Example 1 shown in FIGS. 6 and 7. Specifically, the peripheral edge 7*d* of the opening at the lower end of the through-hole 7*c* of the spacer 7 may be chamfered, an O-ring placement groove 7*e* may be formed in the upper surface 7*b* of the spacer 7, and the O-rings 9', 10' may be placed in the chamfered portion of the peripheral edge 7*d* of the lower-end opening and the O-ring placement groove 7*e*, respectively.

Figure 8:
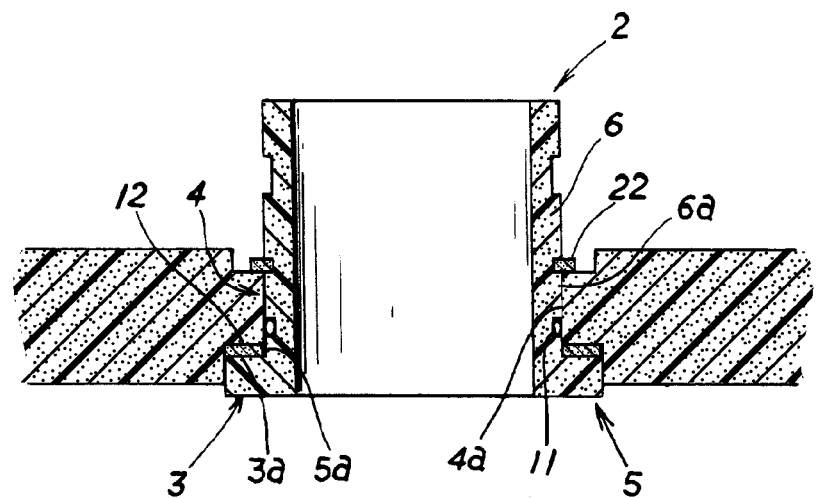
FIG. 8 is an enlarged schematic transverse sectional view showing Alternate Example 2-1.
Figure 9:
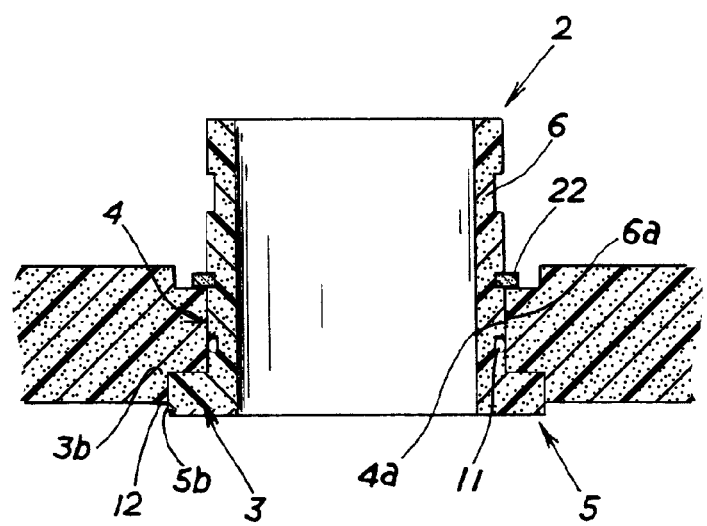
FIG. 9 is an enlarged schematic transverse sectional view showing Alternate Example 2-2.

The main example is configured as described above, but a configuration may also be adopted in which the introduction/discharge parts 2 are each composed of a through-hole 4 having a concave step part 3 in the portion communicated with the inside of the pipe, the through-hole 4 being formed in the peripheral surface of the pipe 1, and a cylinder 6 having a collar 5 at one end thereof for engaging with the concave step part 3, the cylinder 6 being provided in the through-hole 4, as in Alternate Example 2-1 shown in FIG. 8. In this case, a fourth seal member 11 (O-ring) for forming a seal between the external peripheral surface 6*a* of the cylinder 6 and the internal peripheral surface 4*a* of the through-hole 4 may be provided on the external peripheral surface 6a of the cylinder 6, and a fifth seal member 12 (flat packing seal) for forming a seal between the upper surface 5a of the collar 5 and the bottom surface 3a of the concave step part 3 may be provided between the upper surface 5a of the collar 5 and the opposing bottom surface 3a of the concave step part 3. The fifth seal member 12 may also be provided between the peripheral surface 5b of the collar 5 and the peripheral surface 3b of the concave step part 3, as in Alternate Example 2-2 shown in FIG. 9.

In a seawater desalination device such as the one shown in FIG. 1, seawater is introduced from the seawater introduction tube 44 at one end in the length direction of the pressure vessel, and the seawater is separated into concentrated seawater and fresh water at a pressure of 1000 psi (6.9 MPa) via a reverse osmosis membrane packed inside the pressure vessel. The concentrated seawater is discharged from a concentrated seawater outlet tube 45 at the other end in the length direction of the pressure vessel, and the fresh water is recovered from fresh water outlet tubes 46 provided at both ends (closure lids) in the length direction of the pressure vessel.

Consequently, during cleaning or other maintenance-related tasks associated with the reverse osmosis membrane, or when two sets of seawater desalination equipment are operated in alternating fashion, a 1000 psi (6.9 MPa) depressurization is necessary. Specifically, a pressure cycle of 0 psi (0 MPa; when depressurized) and 1000 psi (6.9 MPa; during operation) is repeated. The same pressure cycle is repeated for the seawater introduction tube 44 and other ducts connected to the pressure vessel.

In conjunction with this pressure cycle, the super stainless steel cylinders 6 forming the introduction/discharge parts 2 that are attached to the FRP pipe 1 are pressed toward the inside wall of the FRP pipe when pressure is applied, and this pressing is released when the pressure is removed. The seal portions of the cylinders 6 are abraded by the pressing and depressurization.

In this instance, when a through-hole 4 having a concave step part 3 in the portion communicating with the inside of the pipe is formed in the peripheral surface of the pipe 1, and a cylinder 6 is provided in the through-hole 4 as in Alternate Examples 2-1 and 2-2 described above, since the collar 5 of the cylinder 6 does not readily protrude toward the inside of the pipe 1, and the collar 5 is fixed in place by the concave step part 3, an advantage is gained in that abrasion of the seal portion during repeated pressurization and depressurization is reduced. However, since the through-hole 4 having a concave step part 3 is provided to the FRP pipe 1, the thickness of the FRP pipe 1 is significantly reduced at portions positioned 90° in relation to the long axis of the pipe (at the 3 o'clock and 9 o'clock positions when the long axis direction of the pipe is at 12 o'clock and 6 o'clock), and a design must be adopted whereby the wall thickness of the pipe 1 where the cylinder 6 is provided is increased in order to compensate for the portions that are less pressure resistant.

The seawater introduction tube 44 and other ducts connected to the pressure vessel do not necessarily have a reverse osmosis membrane packed inside, and the seawater introduction tube 44 and other ducts need only be capable of introducing and discharging seawater or concentrated seawater. The collars 5 of the cylinders 6 provided in these ducts do not cause any practical problems by protruding to the inside. Specifically, through-holes 4 having the abovementioned concave step parts 3 may be provided to these ducts so that the collars 5 of the cylinders 6 do not protrude into the pipe 1, but this method involves a complex process of increasing the wall thickness of the sites where the cylinders 6 are provided, as described above (it is inconvenient to increase the thickness of some portions in localized fashion during filament winding).

When the collar 5 of a cylinder 6 protrudes into the pipe 1, the collar 5 of the cylinder 6 comes in contact with the inside wall of the pipe at the 3 o'clock and 9 o'clock positions of the inside wall of the pipe due to the seal formed by the first seal member 8 (O-ring) on the side of the cylinder 6 and the fixing by the snap ring 22 (C-type retaining ring) for fixing the cylinder 6 on the external surface of the pipe 1, in the same manner as in the pressure vessel, but contact with the pipe 1 occurs in no other locations. In such an arrangement, the entire cylinder is expanded by the pressurization/depressurization cycle, deformation occurs at the O-ring site, and abrasion at the O-ring site increases. When the O-ring site is repeatedly abraded, the seal performance of the abraded portion with respect to seawater is adversely affected, and water leakage occurs.

The semicircular spacer 7 described above is therefore provided in order to improve contact between the inside wall of the pipe and the collar 5 of the cylinder 6. Furthermore, the spacer 7 is provided with an upper surface 7b having a convex curved shape such as conforms to the concave curved shape of the internal peripheral surface 1a of the pipe 1, a flat packing seal (or O-ring) is provided to the bottom surface 7a, and the cylinder 6, pipe 1, and spacer 7 are sealed. Abrasion of the O-ring site by the pressurization/depressurization cycle can thereby be reduced, and water leakage can be eliminated. There is no need for complex processing of the spacer 7 when a flat packing seal is used, but an O-ring placement groove must be formed in the spacer when an O-ring is used. It has been confirmed that 10,000 cycles of pressurization and depressurization can be withstood when a flat packing seal is used, and that 100,000 cycles of pressurization and depressurization can be withstood when an O-ring is used.

The main example is of a case in which a plurality of introduction/discharge parts 2 is provided as described above, but a configuration may also be adopted in which a single introduction/discharge part 2 is provided.

Figure 10:
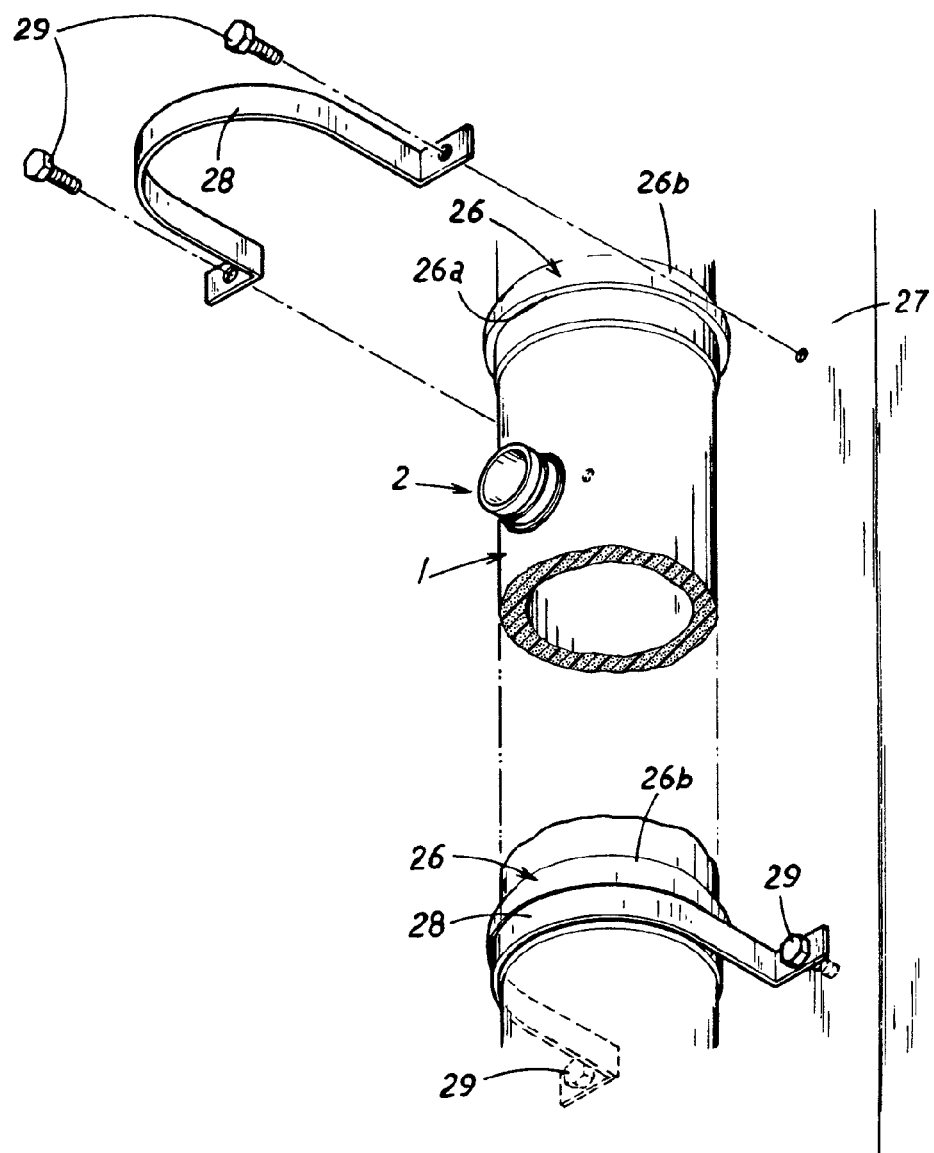
FIG. 10 is a schematic perspective view showing the main example.

A plurality of convex bands 26 may be provided at predetermined intervals in the length direction of the pipe 1. A vertical surface 26a perpendicular to the length direction of the pipe 1 is provided at one end of each convex band 26, and a tapered surface 26b is provided at the other end. In the main example, a case is assumed in which the pipe 1 is attached in a vertical state to a vertical frame 27 (support body), the vertical surfaces 26a are provided at the bottom, and the tapered surfaces 26b are provided on top. Consequently, as shown in FIG. 10, U-shaped bands 28 for engaging with the vertical surfaces 26a are fixed to the frame 27 by bolts 29 or the like, and the pipe 1 can thereby be securely supported by the frame 27.

The convex bands 26 may be integrally molded by the filament winding method at the same time as the pipe 1 or may be added after the pipe 1 is molded (using the same material or a different material than the pipe 1). When the convex bands 26 are integrally formed at the same time as the pipe 1, the convex bands 26 do not easily separate from the pipe 1, due to being integrated therewith, and have extremely high strength, and the pipe 1 can be accordingly well supported on the frame 27.

Figure 11:
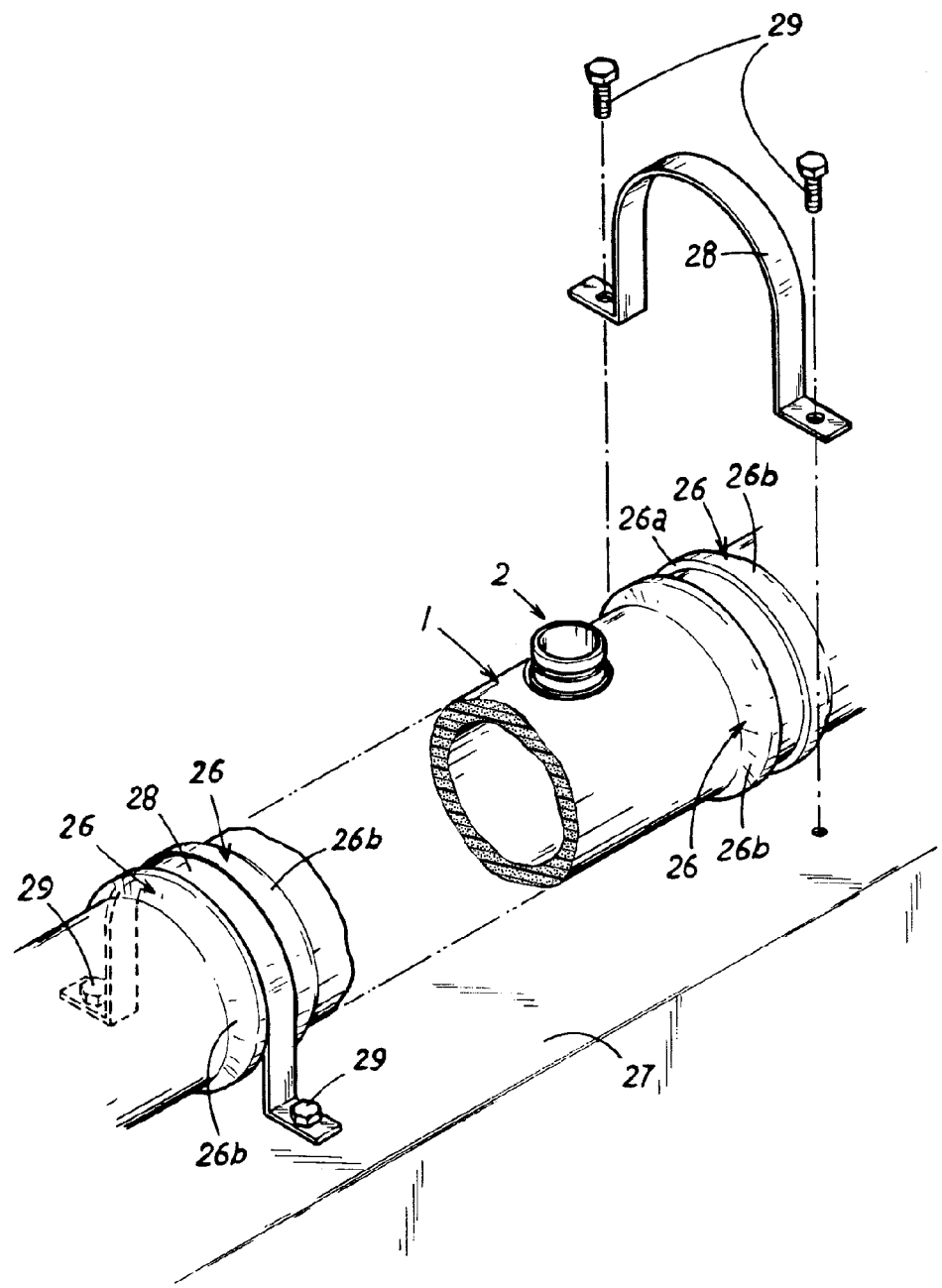
FIG. 11 is a schematic perspective view showing Alternate Example 3.

A case may also be assumed in which the pipe 1 is horizontally attached as shown in FIG. 11, for example, and a plurality of pairs of convex bands 26 may be provided at predetermined intervals a pair at a time so that the vertical surfaces 26a face each other. In this case, U-shaped bands 28 for engaging with the vertical surfaces 26a are provided between the pairs of convex bands 26 in which the vertical surfaces 26a face each other, and the bands 28 are fixed to the (vertical or horizontal) frame 27, whereby the pipe 1 can be securely supported even when struck by water hammer (water-hammering) or the like.

In the main example, a closure structure utilizing a closure lid 13 or the like such as described above is used as the closure structure of the pipe 1, but a different closure structure may also be used. In the main example, a joint structure using a joint part 14 such as described above is used as the joint structure of the pipe 1, but a different joint structure may also be used.

Since the main example is configured as described above, a pipe 1 provided with a plurality of introduction/discharge parts (side ports) can be manufactured so as to be lightweight and substantially less expensive than a super stainless steel pipe, and that has highly exceptional corrosion resistance due to being made of fiber-reinforced resin.

Specifically, the introduction/discharge parts 2 can be satisfactorily provided to the pipe 1 without the need for a weld joint by adopting configurations in which the introduction/discharge parts 2 are composed of a through-hole 4 formed in the peripheral surface of the pipe 1, and a cylinder 6 having a collar 5 at one end thereof, the cylinder 6 being provided in the through-hole 4; and in which a spacer 7 having an upper surface shape that conforms to the curved shape of the internal peripheral surface 1a is provided between the collar 5 of the cylinder 6 and the internal peripheral surface 1a of the pipe.

There is also no need to cut the internal peripheral surface 1a of the pipe 1 to keep the cylinder 6 from coming out, the thickness of the pipe 1 can be accordingly reduced, and the pipe 1 can be made even lighter and less expensive.

The closure lid 13 can also be provided by providing a concave part 17 to the internal surface of the pipe 1 and bolting the closure lid 13 to a retainer ring 16 fitted in the concave part 17, and the end of the pipe can be satisfactorily closed without the need for a weld joint.

A closure structure using the concave part 17, retainer ring 16, and closure lid 13 makes it possible to set the burst pressure to 22 MPa or higher; i.e., to set the burst pressure to the minimum of 27.58 MPa or higher that must be satisfied for seawater desalination applications. Consequently, a design pressure of 5.516 MPa (800 psi) or higher can be achieved, and high corrosion resistance can be achieved together with the ability to suitably utilize the present invention not only in a reverse osmosis desalination device, but also in other applications; e.g., as a duct in a soy sauce manufacturing device or the like.

Furthermore, the joint part 14 can be provided by a bolt connection to the other end of the pipe 1, and the joint part 14 can be satisfactorily provided without the need for a weld joint. Since the O-ring is loaded at this location, the duct mechanism has satisfactory seal performance for preventing the liquid (seawater or concentrated seawater) flowing in the fiber-reinforced resin pipe from leaking even when the pipe is pressurized. It is also possible to replace only this part (when welded, the weld must be fused or the entire pipe replaced).

By providing a seal member at each joint portion, the need for a weld joint is eliminated, satisfactory seal performance can be demonstrated, and inasmuch as there is no corrosion at the weld joints, excellent corrosion resistance relative to a super stainless steel pipe is obtained.

Consequently, in the main example, not only is excellent corrosion resistance obtained, but there is no need for a weld joint when providing the introduction/discharge parts, closure lid, or joint part; and the resulting pipe is extremely practical, lightweight, easily handled, and substantially less expensive than a super stainless steel pipe.

Experiments illustrating the effects of the main example will now be described.

FIG. 12 shows the results of burst (breakage) testing according to Experiments 1 through 5 using test samples satisfying three required conditions A, B, and C, wherein A is the joint structure of the joint part, B is the closure structure using a closure lid, and C is the structure of the introduction/discharge part. Each experiment focused on a contributing factor described below to examine the variation in burst pressure caused by varying each condition. The specification value used was the minimum burst pressure of 27.58 MPa (4000 psi) necessary for use in a seawater desalination device.

Experiment 1

The wall thickness of the filament winding pipe 1 was increased.

Experiment 2

The flange 24 was made thinner than in Experiment 1, and the length from the retainer ring concave part 17 to the end of the pipe 1 was made less than in Experiment 1.

Experiment 3

A hoop was wound onto the periphery of the introduction/discharge part 2 of Experiment 2 in order to increase the burst pressure of the periphery.

Experiment 4

The wall of the filament winding pipe 1 was made thinner than in Experiment 3; a combination of the first seal member 8 (O-ring), second seal member 9, and third seal member 10 (flat packing seal) was used as the method of sealing the cylinder 6 of the introduction/discharge part 2; and the spacer 7 having an upper surface shape conforming to a curve was also provided.

Experiment 5

The wall of the filament winding 1 was made thicker than in Experiment 4, and the hoop winding was eliminated from the periphery of the introduction/discharge part 2.

In Experiments 1 through 3, the concave step part was provided in the through-hole as in the alternative examples described above, and it was confirmed by comparison to Experiments 1 and 2 that the burst pressure was affected by the shape of the concave step part of the through-hole. It was also confirmed by comparison to Experiments 2 and 3 that increasing the wall thickness and providing reinforcement with a hoop layer enabled the specification value to be satisfied even when the concave step part had a weak shape.

In Experiments 4 and 5, a spacer was provided as in the main example described above, and the specification value was confirmed to have been satisfied by each of the shapes.

It was also confirmed by comparison of Experiments 1 through 3 with Experiments 4 and 5 that when a spacer was provided; i.e., when the internal peripheral surface of the pipe was not cut, a satisfactory burst pressure was obtained using a smaller wall thickness.

The invention claimed is:

1. A fiber-reinforced resin pipe comprising:

a plurality of introduction/discharge parts for introducing or discharging a liquid via a peripheral surface of the pipe, the introduction/discharge parts being arranged at intervals in an axial direction, wherein each introduction/discharge parts comprises a through-hole formed in the peripheral surface of said pipe and a cylinder having a collar at one end thereof, the cylinder being provided in the through-hole;

a spacer provided between the collar of the cylinder and an internal peripheral surface of said pipe, the spacer having a curved upper surface shape that conforms to a curved shape of the internal peripheral surface; and a first seal member for forming a seal between an external peripheral surface of the cylinder and an internal peripheral surface of said through-hole provided to the external peripheral surface of said cylinder.

2. The fiber-reinforced resin pipe according to claim 1, further comprising:

a second seal member for forming a seal between an upper surface of the collar and a bottom surface of said spacer provided between the upper surface of said collar and the bottom surface of said spacer.

3. The fiber-reinforced resin pipe according to claim 2, further comprising:

a third seal member for forming a seal between an upper surface of the spacer and an internal peripheral surface of said pipe provided between the upper surface of said spacer and the internal peripheral surface of said pipe.

4. An introduction/discharge part comprising:
a cylinder;
a collar disposed at one end of the cylinder; and
a spacer through which the cylinder protrudes, the spacer having a bottom surface that faces an upper surface of the collar, wherein the spacer comprises an upper surface opposite the bottom surface of the spacer, the upper surface of the spacer having a curved shape configured to conform to a curved shape of an inner peripheral surface of a pipe about a through hole of the pipe in which the cylinder is to be inserted; and
a first seal member disposed about an external peripheral surface of the cylinder for forming a seal between an external peripheral surface of the cylinder and an internal peripheral surface of the through-hole provided to the external peripheral surface of the cylinder.

5. The introduction/discharge part according to claim 4, further comprising:

a second seal member disposed between the upper surface of the collar and the bottom surface of the spacer.

6. The introduction/discharge part according to claim 5, further comprising:

a third seal member disposed on the upper surface of the spacer.

7. The introduction/discharge part according to claim 6, wherein the first seal member is an O-ring, and wherein the second seal member and the third seal member are flat packing seals.

8. The introduction/discharge part according to claim 4, wherein the curved shape of the upper surface of the spacer is a convex shape that conforms to a concave shape of the curved shape of the inner peripheral surface of the pipe about the through hole.

* * * * *